United States Patent
Higgs et al.

(10) Patent No.: US 8,729,149 B2
(45) Date of Patent: *May 20, 2014

(54) SILICONE HYDROGELS AND METHODS OF MANUFACTURE

(71) Applicant: Contamac, Ltd., Saffron Walden (GB)

(72) Inventors: Timothy Higgs, Cambridge (GB); Tristan Tapper, Haverhill (GB); Richard Young, Linton (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/867,327

(22) Filed: Apr. 22, 2013

(65) Prior Publication Data

US 2013/0274371 A1 Oct. 17, 2013

Related U.S. Application Data

(63) Continuation of application No. 13/360,568, filed on Jan. 27, 2012, now Pat. No. 8,440,738, which is a continuation-in-part of application No. 13/076,336, filed on Mar. 30, 2011, now abandoned, which is a continuation of application No. 12/169,788, filed on Jul. 9, 2008, now Pat. No. 7,939,579.

(51) Int. Cl.
*G02B 1/04* (2006.01)
*C08F 30/08* (2006.01)
*A61F 2/14* (2006.01)
*A61F 2/16* (2006.01)

(52) U.S. Cl.
USPC .............. 523/106; 523/107; 526/279

(58) Field of Classification Search
CPC ............ G02B 1/00; G02B 1/04; G02B 1/043; G02C 7/04
USPC .............. 523/107; 526/279, 499; 528/499
See application file for complete search history.

(56) References Cited

U.S. PATENT DOCUMENTS

| | | | |
|---|---|---|---|
| 4,022,754 A | 5/1977 | Howes et al. | |
| 4,216,303 A | 8/1980 | Novicky | |
| 4,433,111 A | 2/1984 | Tighe et al. | |
| 4,486,577 A | 12/1984 | Mueller et al. | |
| 4,602,074 A | 7/1986 | Mizutani et al. | |
| 4,686,267 A | 8/1987 | Ellis et al. | |
| 4,766,189 A | 8/1988 | Tsuetaki et al. | |
| 4,780,515 A | 10/1988 | Deichert | |
| 4,954,587 A | 9/1990 | Mueller | |
| 4,990,582 A | 2/1991 | Salamone | |
| 5,010,141 A | 4/1991 | Mueller | |
| 5,011,275 A | 4/1991 | Mueller | |
| 5,115,056 A | 5/1992 | Mueller et al. | |
| 5,194,556 A * | 3/1993 | Mueller et al. | 528/28 |
| 5,244,981 A * | 9/1993 | Seidner et al. | 525/479 |
| 5,314,960 A * | 5/1994 | Spinelli et al. | 525/280 |
| 5,331,067 A * | 7/1994 | Seidner et al. | 525/479 |
| 5,710,302 A * | 1/1998 | Kunzler et al. | 556/434 |
| 5,770,669 A * | 6/1998 | Robertson et al. | 526/279 |
| 5,981,615 A * | 11/1999 | Meijs et al. | 522/137 |
| 6,818,719 B2 * | 11/2004 | Fujisawa et al. | 526/323.2 |
| 6,867,245 B2 | 3/2005 | Iwata et al. | |
| 7,934,830 B2 | 5/2011 | Blackwell et al. | |
| 2002/0016383 A1 | 2/2002 | Iwata et al. | |
| 2006/0012751 A1 * | 1/2006 | Rosenzweig et al. | 351/160 R |
| 2006/0142524 A1 * | 6/2006 | Lai et al. | 528/25 |
| 2006/0142525 A1 * | 6/2006 | Lai et al. | 528/25 |
| 2007/0132949 A1 * | 6/2007 | Phelan | 351/166 |
| 2007/0291223 A1 * | 12/2007 | Chen et al. | 351/160 R |
| 2007/0296914 A1 * | 12/2007 | Hong et al. | 351/160 H |
| 2008/0048350 A1 * | 2/2008 | Chen et al. | 264/2.6 |
| 2008/0314767 A1 * | 12/2008 | Lai et al. | 206/5.1 |
| 2009/0176909 A1 * | 7/2009 | Benz | 523/106 |
| 2010/0016514 A1 | 1/2010 | Qiu | |

FOREIGN PATENT DOCUMENTS

WO  WO9323774 A1  11/1993
WO  WO03037944 A1  5/2003

OTHER PUBLICATIONS

Contact Lens Specturm, Silicone Hydrogels: The Evolution of a Revolution (http://clspectrum.com/article/aspx?article=12952), issue date, Feb. 2006, 12 pages.

* cited by examiner

*Primary Examiner* — Robert S Loewe
(74) *Attorney, Agent, or Firm* — Leyendecker & Lemire, LLC

(57) ABSTRACT

Embodiments of silicone hydrogels, ophthalmic lenses made therefrom, and methods of making the same are described. Fully hydrated silicone hydrogels have relatively high water content and oxygen permeability, along with relatively low modulus of elasticity. Embodiments of the silicone hydrogels in substantially dehydrated condition are adapted to lathe cutting at or above room temperature. Variations of the silicone hydrogels include silicon-containing monomers in an amount of 7.5% or greater by weight, a hydrophilic substituted N-vinyl acetamide monomer, and a hydrophilic non-acetamide monomer in an amount resulting in a hydrophilic substituted N-vinyl acetamide monomer to hydrophilic non-acetamide monomer weight to weight ratio of greater than 2.1 to 1.

12 Claims, No Drawings

SILICONE HYDROGELS AND METHODS OF MANUFACTURE

The present application is a Continuation of U.S. patent application Ser. No. 13/360,568 filed 27 Jan. 2012, which is a Continuation-In-Part of U.S. patent application Ser. No. 13/076,336 filed 30 Mar. 2011, which is a Continuation of U.S. patent application Ser. No. 12/169,788, filed 9 Jul. 2008 and issued as U.S. Pat. No. 7,939,579 on 10 May 2011. All of the aforementioned patent applications share a common inventor and are incorporated into the present application by reference.

BACKGROUND

Materials must meet demanding criteria in order to function effectively in a biocompatible role, where sustained intimate contact with the internal or external tissues of a living organism is required. Contact lenses for ophthalmic applications must meet particularly demanding criteria, and materials from which lenses are made must therefore also possess a demanding combination of properties. A lens material must be sufficiently oxygen permeable to allow adequate oxygen to permeate through it so as to sustain the corneal health of the wearer. Lenses must be sufficiently physically robust to retain their integrity while being worn in the wearer's eye, as well as during handling, insertion, and removal. During wear, lens surfaces must be wettable and lubricious, while concomitantly resisting deposition of proteins, lipids, and other biochemical compounds. Lens material must also be highly transparent, and lenses that are soft and highly pliable are generally more comfortable to wear.

Some of the above characteristics are difficult to achieve concomitantly. Rigid ophthalmic lenses have good visual clarity and are generally sufficiently physically robust, but their lack of pliability, among other factors, can make them uncomfortable for some users to wear. Soft contact lenses have a lower tensile modulus that makes them more comfortable to wear, but decreased modulus often comes at the expense of decreased tear strength. Moreover, soft ophthalmic lenses typically cover a larger area and conform closely to the contour of the surface of an eye than rigid ophthalmic lenses. Accordingly, soft ophthalmic lenses typically need to have sufficient oxygen permeability to avoid corneal hypoxia.

Ophthalmic lenses made of non-silicone hydrogels typically have moderate to high water content (38-75%) and, provided the lens is sufficiently thin, can be fabricated to exhibit viable oxygen permeability with a satisfactory level of wettability. However, elevated oxygen permeability characteristics are difficult to attain with non-silicone hydrogels, and high water content hydrogels can be physically unstable, having a tendency to reduce in size with increases in temperature. In addition, thin lenses made from materials with high water content are also prone to dehydrate on the eye, which can result in lower on-eye oxygen permeability and which can in some instances lead to serious clinical complications. For lathe cut lenses, which often have increased thickness compared to cast-molded lenses, oxygen transmissibility levels can approach undesirably low values.

Silicone hydrogels generally have higher oxygen permeability than non-silicone hydrogels, but high silicone content can result in increased modulus and low surface energy properties that lead to poor wettability and ultimately deposition of biological materials, especially lipids, on lens surfaces. High silicone content material also tends to be difficult or impossible to lathe at or above room temperature, thereby making manufacture of ophthalmic lenses by lathing silicone hydrogel material impractical. Silicone hydrogel material that has a $T_g$ at or near room temperature may nonetheless be difficult or impossible to lathe at room temperature because cutting the silicone hydrogel with a lathe leads to the warming of the surface of the material being cut. Lowering silicone content typically results in decreased oxygen permeability where equilibrium water content remains constant.

Ophthalmic lenses made from silicone hydrogels can achieve an adequate, albeit not optimal, balance of surface wettability and resistance to deposition, modulus of elasticity, tear resistance, and oxygen permeability. However, manufacturing silicone hydrogel polymers and lenses therefrom introduces problems that are difficult and/or expensive to overcome. Moreover, it can be difficult to simultaneously achieve high oxygen permeability, low modulus and a viable level of wettability in silicone hydrogels, and conversely it can be difficult to attain high water content silicone hydrogels that possess sufficient silicone content to exhibit desirable oxygen permeability characteristics. An additional complication is that lenses comprising high water content silicone hydrogels including abundant N,N-dimethyl acrylamide and N-vinyl pyrrolidone tend to swell incrementally when stored in water or aqueous buffer for extended periods, limiting the shelf life of such lenses. Finally, silicone hydrogel lenses that have high water content tend to suffer from high water loss rates that result in undesirable dehydration of both lenses and wearers' eyes.

Silicon-containing monomers and hydrophilic monomers, from which silicone hydrogels are typically formulated, tend to resist amalgamation and instead form separate phases in polymerization reaction mixtures comprising relatively high concentrations of hydrophilic and silicon-containing monomers. Manufacture of silicone hydrogels is thus complicated by the tendency of polymerization reaction mixtures to segregate into predominantly hydrophilic and hydrophobic phases, which can negatively impact both the course of the polymerization and the silicone hydrogel polymer thus formed. Silicon-containing monomers are often chemically modified to form prepolymers or macromonomers with relatively hydrophilic substituents that can be used in higher proportions than monomers containing exclusively silicone functionalities. Such silicone-containing prepolymers and macromonomers can be mixed more readily with hydrophilic monomers, helping to avoid phase segregation in polymerization reaction mixtures comprising relatively high concentrations of these silicone-containing species.

U.S. Pat. No. 4,711,943 (the Harvey patent) discloses silicone hydrogels comprising modified silicon-containing monomers, the modified silicon-containing monomers comprising a urethane linkage. Harvey discloses silicone hydrogels having exceptional putative physical properties. One example of silicone hydrogels disclosed in Harvey purportedly has a fully hydrated water content of 50.3%, oxygen permeability of 43 Barrers, and an exceptionally low modulus of elasticity of $1.6 \times 10^{-6}$ dynes/cm$^2$ ($1.6 \times 10^{-13}$ MPa; see Sample A, Harvey Table XII). However, this modulus value is not credible. Persons of ordinary skill in the art recognize that $1.6 \times 10^{-6}$ dynes/cm$^2$ is an unfeasibly low modulus value, approximately 12 to 14 orders of magnitude below a sensible number. Accordingly, it is tempting to suggest that the author(s) of the Harvey patent were confused about the sign on the exponent, and the modulus value should be a more reasonable $1.6 \times 10^6$ dynes/cm$^2$. However, $1.6 \times 10^6$ dynes/cm$^2$ (0.16 MPa) remains a very low modulus value for a silicone hydrogel, especially one comprising 43.38% N-[tris(trimethylsiloxy)silylpropyl]methacrylamide (TSMAA), leading persons of ordinary skill to reasonably surmise that the absolute value of the modulus exponent is incorrect as well as the sign.

Further evidence that modulus values disclosed in the Harvey patent are unfounded is shown in many other tables, and particularly in Table XIX, where modulus values of about $1.9 \times 10^{-10}$ dynes/cm$^2$ ($1.9 \times 10^{-17}$ MPa) are disclosed in silicone compositions containing 35% to 40% TSMAA. Such values are inconceivably low. Other spurious physical parameter values, including values that would make more sense if signs on exponents are reversed, appear endemic within the Harvey patent. However, it is beyond the scope of this application to trouble-shoot the surfeit of errors in the Harvey patent.

In summary, the Harvey patent discloses modulus values that defy credibility by persons of ordinary skill in the art. Accordingly, modulus figures disclosed in Harvey are not convincing. Nevertheless, Harvey discloses a silicone hydrogel embodiment with fully hydrated water content of 58.2% and oxygen permeability (Dk) of 35.2 Barrers, and another silicone hydrogel embodiment with oxygen permeability (Dk) of 58 Barrers and water content of 37.6%. These water content and oxygen permeability values are fully plausible in that the Dk values are elevated above what would be predicted exclusively on the basis of the equilibrium water contents (EWC) of these polymers using the Benjamin and Young 'Dk-EWC' correlation [log(Dk)=0.01754 (% GEWC)+ 0.3897],[1] where % GEWC is the gravimetric EWC, for which a conventional 35.2% (EWC) polymer would be predicted to exhibit a Dk of 10.2 Barrers and a 37.6% (EWC) polymer a Dk of 11.2 Barrers.

[1] Young, Matthew D.; Benjamin, William J., *Eye & Contact Lens: Science & Clinical Practice*: April 2003—Volume 29—Issue 2—pp 126-133.

U.S. Pat. No. 5,486,579 (the Lai patent) discloses silicone hydrogel compositions comprising silicon-containing monomers with urethane linkages. The silicone hydrogels disclosed in Lai have varied water content and modulus of elasticity that are adjusted by varying abundance of hydrophilic monomers, including N-vinyl pyrrolidone (NVP) and N,N-dimethyl acrylamide (DMA). Lai discloses silicone hydrogels with modulus values as low as 0.62 MPa ($6.2 \times 10^6$ dynes/cm$^2$) at 37% fully hydrated water content (Table 1), but does not disclose any fully hydrated water content above about 46% (Table 1), and no modulus below 0.62 MPa.

Interestingly, the Lai patent claims modulus values as low as 0.05 MPa ($5.0 \times 10^5$ dynes/cm$^2$ in claim 5 and 15), an exceptionally low but not inconceivable value. However, Lai does not disclose to how a person of ordinary skill in the art might achieve such low modulus in silicone hydrogels. Moreover, it is not implicit that silicone hydrogel formulations such as those disclosed in Lai could achieve modulus values lower than those of the specific examples disclosed.

Conversely, the Lai patent suggests that silicone hydrogels preferably have oxygen permeability of Dk>60 Barrers (Lai column 6, lines 58-59). A person of ordinary skill in the art would recognize that Dk>60 Barrers is possibly an inherent quality in a silicone hydrogel composition such as disclosed in Lai, examples of which contain about 30%-47% TRIS (Lai columns 9 and 10) and an equilibrium water content≤46%. Lai does not, however, explicitly enable a person of ordinary skill in the art to make a silicone hydrogel with oxygen permeability>60 Barrers.

In summary, the Lai patent discloses silicone hydrogels with fully hydrated water content around 25% to 46% that also have modulus values of 0.62 MPa to 0.85 MPa ($6.3 \times 10^6$ dynes/cm$^2$ to $8.5 \times 10^6$ dynes/cm$^2$). Lai does not disclose how a person of ordinary skill in the art can make a silicone hydrogel with a modulus below 0.62 MPa, and embodiments of hydrogels and processes for making hydrogels exemplified in Lai do not implicitly achieve the low modulus claimed in Lai claims 5 and 15.

U.S. Pat. No. 6,649,722 (the Rosenzweig patent) discloses silicone hydrogel compositions that achieve relatively high oxygen permeability (Dk=117 Barrers) at moderately low water content (32%), and lower oxygen permeability (88 Barrers) at higher water content (46%). Rosenzweig discloses silicone hydrogels with water content as high as 53%, but does not disclose a Dk value for 53% water content silicone hydrogel. The Rosenzweig disclosure shows a loose inverse correlation between water content and oxygen permeability in the Rosenzweig silicone hydrogels. Rosenzweig also discloses numerous silicone hydrogels that comprise styrene or substituted styrene.

United States Patent Application No. 2006/0004165 (the Phelan application) discloses silicone hydrogel compositions that are prepared from reaction mixtures comprising urethane macromonomers and styrene or substituted styrene monomers. Examples of silicone hydrogel material disclosed in Phelan have oxygen permeability≥65 Barrers and glass transition temperatures ($T_g$) in a 60-68° C. range. Interestingly, Phelan discloses room temperature lathability and associated property $T_g$ of 60° to 68° in silicone hydrogels comprising styrene or substituted styrenes that are remarkably similar to silicone hydrogels comprising styrene or substituted styrene disclosed in Rosenzweig.

DETAILED DESCRIPTION

Embodiments of the present invention comprise biocompatible material adapted to be in relatively sustained, intimate, contact with sensitive tissues of living organisms. Embodiments of silicone hydrogels have properties including oxygen permeability (Dk) greater than 45 Barrers, modulus of elasticity less than 1.0 MPa, sessile contact angle (a measure of wettability) of less than 110°, and fully hydrated water content greater than 60%. The hydrogels show increasing oxygen permeability with increasing abundance of a silicon-containing monomer at a constant level of hydrogel hydration.

Some silicone hydrogels are sufficiently rigid in a substantially dehydrated state to be lathable at or above room temperature. Embodiments include hydrogels with a Shore D hardness of 70 or greater at 21° C., or with $T_g$ at or above room temperature. Variations of ophthalmic lenses made from silicone hydrogel embodiments have on-eye water loss of less than 3%. On-eye water loss refers to a decrease in water content of an ophthalmic lens that occurs when the ophthalmic lens is worn on a user's eye during an interval of 8 hours or more.

Embodiments of hydrogels contemplated in the present invention comprise silicone hydrogel copolymers. Silicone hydrogels typically contain one or more silicon-containing monomers in addition to one or more hydrophilic monomer components, and may optionally contain other components to further modify or enhance the physicochemical properties of the polymer. These other components include but are not limited to fluorine-containing monomers, specific cross-linking monomer combinations and structural (strengthening) monomers. Additional variants of hydrogels comprise compounds employed to change or enhance the color of ophthalmic lenses or other hydrogel products, and some embodiments comprise compounds employed for their UV absorbing properties.

Embodiments of silicone hydrogels and contact lenses disclosed and claimed herein do not require surface treatment in order to achieve the disclosed or claimed physical properties such as modulus, oxygen permeability, oxygen transmissibility, water content, lubricity or surface hydrophilicity.

Embodiments of silicone hydrogels further comprise a first polymer comprising a silicon-containing monomer, the first polymer being in molecular entanglement with a second polymer. The second polymer may or may not comprise a silicon-containing monomer. The first polymer is typically in molecular entanglement with a second polymer through formation of an interpenetrating network (IPN). The IPN may be formed through sequential IPN, simultaneous IPN, or other IPN techniques.

Embodiments of silicone hydrogels further comprise polymerization reaction products of a reaction mixture, the reaction mixture comprising both a silicon-containing monomer and a hydrophilic monomer, together with a cross-linking monomer and a suitable polymerization initiator, and then optionally further performance-enhancing components such as a fluorine-containing monomer. Reaction mixtures may comprise two or more different species of hydrophilic monomer. Silicone hydrogel polymerization reaction mixtures typically comprise monomers that have a polymerizable reactive functional group, such as a vinyl, acrylate, or methacrylate group.

Some embodiments of silicone hydrogel reaction mixtures are substantially free of silicone-containing pre-polymers or silicone-containing macromonomers, and some variations are substantially free of end-capped or other derivatized monomers. Monomers that have not participated in a polymerization or pre-polymerization reaction, and therefore have not been transformed into prepolymers or macromonomers, are referred to here as true monomers.

Embodiments of silicon-containing monomers include, but are not limited to, bulky silyl monomers. For the purposes of this application, bulky silyl monomers consist of compounds having the following general formula [I],

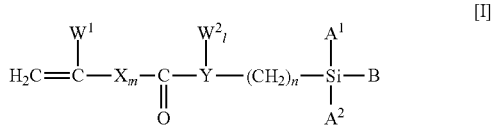

where $W^1$ is $CH_3$ or H; $W^2$ is $CH_3$ or H; l is 0 where Y is O (oxygen) and l is 1 where Y is N (nitrogen); m is 0 or 1; n is an integer from 1 to 6, inclusive; $A^1$, and $A^2$ are the same or are different and are selected from the group consisting of trialkyl siloxy and lower alkyl functional groups; B is the same as or is different from $A^1$ or $A^2$ and is selected from the group consisting of the following formula [II],

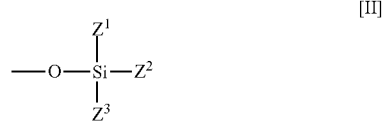

where $Z^1$, $Z^2$, and $Z^3$ are the same or are different and are selected from the group consisting of phenyl, benzyl, trialkyl siloxy, and lower alkyl functional groups; Y is O or N; and X is selected from the group consisting of the following formulas [III] and [IV],

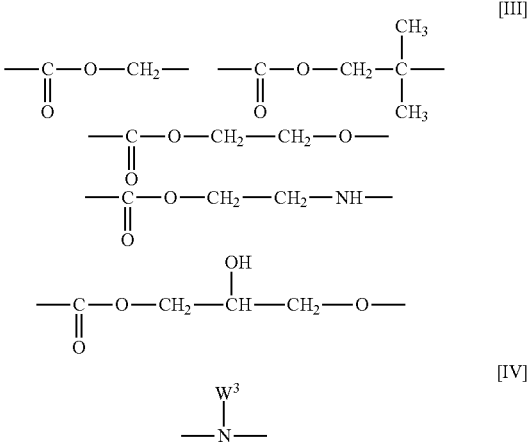

where $W^3$ is H or an alkyl functional group.

Silicon-containing monomers further comprise monomers having one or more alkyl siloxy functional groups. Examples of silicon-containing monomers having one or more alkyl siloxy functional group include 3-(tris(trimethylsiloxy)silyl) propyl methacrylate (TRIS), having the following formula [V],

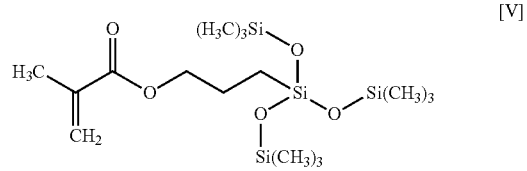

and (3-methylacryloxy-2-hydroxypropoxy)propylbis(trimethylsiloxy)methylsilane (SiGMA), having the formula [VI].

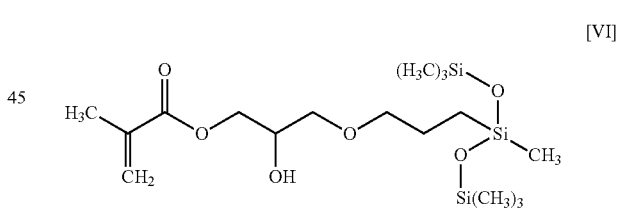

SiGMA is also used to designate a minor isomer, (2-methylacryloxy-3-hydroxypropoxy)propylbis(trimethylsiloxy) methylsilane, having the formula [VII].

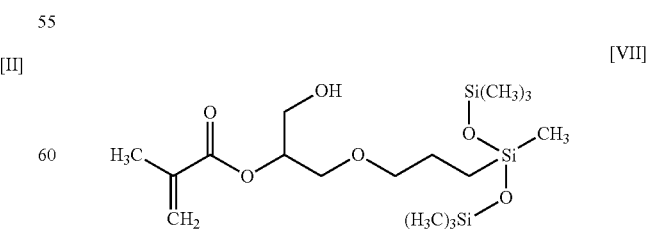

For the purposes of this specification and appended claims, the term SiGMA refers to a composition comprising either or both of the isomers represented in formulas [VI] and [VII].

Bulky silyl monomers frequently, but not necessarily, have one or more alkyl siloxy functional groups. However, SiGMA is an example of a silicon-containing monomer having one or more alkyl siloxy functional groups, but that is not a bulky silyl monomer.

Other silicone-containing monomers include, but are not limited to: O-[3-(tris(trimethylsiloxy)silyl)propyl]-N-[2'-(methacryloyloxy)ethyl]carbamate; O-[2-(methacryloyloxy)ethyl]-N-[3'-(tris(trimethylsiloxy)silyl)propyl]carbamate; N-(3-((trimethylsiloxy)silyl)propyl)methacrylamide; 1,3-bis(3'-methacrylamidopropyl)-1,1,3,3-tetrakis(trimethylsiloxy)disiloxane; 1-(3'-methacryloyloxypropyl)-1,1,3,3,3-pentamethyldisiloxane; 1,3-bis(3'-methacryloyloxypropyl)-1,1,3,3-tetramethyldisiloxane; 1-(3'-methacryloyloxypropyl)polydimethylsiloxane; and 1-(3'-acryloyloxypropyl)polydimethylsiloxane. Embodiments of silicone-containing monomers include other silicone-containing monomers, including true monomers and other monomers.

Hydrophilic monomers include, but are not limited to, N,N-dimethyl acrylamide (DMA), having the following formula [VIII],

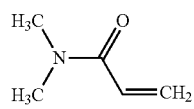

2-hydroxyethyl methacrylate (HEMA), having the following formula [IX],

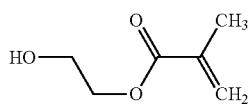

N-methyl-N-vinylacetamide (MVAc), having the following formula [X],

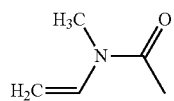

2-hydroxyethyl acrylate, 3-hydroxypropyl acrylate, 3-hydroxypropyl methacrylate, N-vinyl-2-pyrrolidone (NVP), glycerol methacrylate, acrylic acid, acrylamide, methacrylic acid, and other hydrophilic monomers. MVAc is sometimes referred to as N-vinyl-N-methylacetamide, and can be abbreviated VMAc.

For the purposes of this specification and appended claims, MVAc is a member of a group of compounds referred to as hydrophilic substituted N-vinyl acetamide monomers, having the general formula [XI],

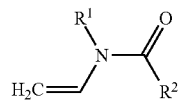

where $R^1$ and $R^2$ are the same or are different, $R^1$ is an alkyl functional group, and $R^2$ is selected from the group consisting of H and an alkyl functional group. Alkyl functional groups include $C_1$-$C_9$ linear and cyclo-alkyl functional groups. Hydrophilic monomers that do not fit within the definition of hydrophilic substituted N-vinyl-acetamide monomers provided above can be referred to as hydrophilic non-acetamide monomers.

Hydrophilic substituted N-vinyl acetamide monomers contain a reactive or polymerized vinylic group positioned β to the carbonyl moiety. Conversely, DMA and HEMA are examples of carbonyl-containing hydrophilic monomers having a vinylic group positioned α to the carbonyl. Polymerized or copolymerized MVAc is more hydrophilic than polymerized or copolymerized DMA, probably because the β positioning of the polymerized vinylic group of MVAc results in less steric shielding of its carbonyl functionality by the polyvinylic chain to which it is associated. Accordingly, the MVAc carbonyl oxygen is more accessible for hydrogen bonding and dipolar attraction to water, resulting in greater hydrophilicity compared to pDMA, where the polymerized vinylic group at an α position likely causes steric shielding of the DMA carbonyl oxygen by its associated polyvinylic chain which is further compounded by the shielding effecting of the two amido-methyl groups on the converse side of this carbonyl functionality. Vinylic groups positioned α to a carbonyl carbon in DMA and β to a carbonyl carbon in a generic hydrophilic substituted N-vinyl acetamide monomer are shown in the following formulas. It is understood that a polymerized vinylic group no longer contains its carbon to carbon double bond, and is thus no longer literally vinylic in character.

Vinylic groups positioned α to a carbonyl carbon in DMA and β to a carbonyl carbon in a generic hydrophilic substituted N-vinyl acetamide monomer are shown in the following formulas [XII].

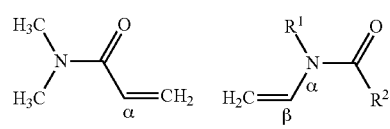

Fluorine-containing monomers include, but are not limited to, 1,1,1,3,3,3-hexafluoroisopropyl methacrylate (HFPM), having the following formula [XIII],

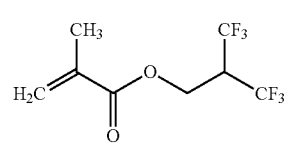

2,2,2-trifluoroethyl methacrylate, 2,2,3,3,3-pentafluoropropyl methacrylate, 2,2,3,3,3-pentafluoropentyl acrylate, 1,1,1,3,3,3-hexafluoroisopropyl acrylate, and other fluorinated monomers.

Cross-linking monomers include, but are not limited to, 1,6-hexanediol diacrylate (HDDA), having the following formula [XIV],

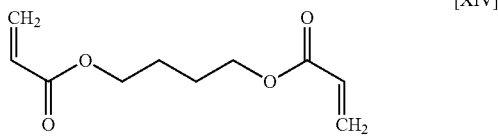

1,2-ethylene glycol dimethacrylate, diallylmaleate, triethyleneglycol dimethacrylate (TGDMA), allyl methacrylate (AMA), and other cross-linking monomers. Cross-linking monomers can also be referred to as cross-linkers or cross-linker monomers.

Initiators include thermal initiators such as, but not limited to, 2,2'-azobisisobutyronitrile (AIBN), shown in the following formula [XV],

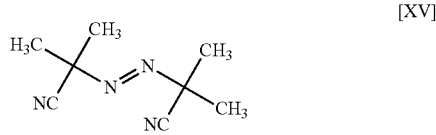

benzoyl peroxide, and 2,2'-azobis(2,4-dimethyl)valeronitrile, and UV initiators such as, but not limited to, 2-hydroxy-2-methyl-1-phenyl-1-propanone and phenylbis(2,4,6-trimethylbenzoyl)phosphine oxide.

Embodiments may also comprise strengthening monomers, such as, but not limited to, methyl methacrylate (MMA), ethyl methacrylate, cyclohexyl methacrylate, other methacrylates, and other strengthening monomers. Addition or incorporation of strengthening monomers into a polymer or copolymer usually reinforces the polymeric material to increase mechanical properties such as tensile strength and tensile modulus.

Embodiments can also include softening monomers such as, but not limited to hexyl methacrylate, 2-ethoxyethyl methacrylate (EEMA), 2-(2'-ethoxyethoxy)ethyl acrylate, poly(ethyleneglycol)-methacrylate and other alkoxyalkyl and alkyloxyalkyloxyalkyl type methacrylates and acrylates. Softening monomers can reduce the modulus of polymers or copolymers into which the softening monomers are incorporated, or of contact lens made therefrom.

It has been observed that contact lenses comprising high water content silicone hydrogel formulations containing base DMA-NVP-TRIS monomer combinations with EWC values in excess of 70% have a tendency to exhibit compromised shelf-life. Such lenses gradually increasing in size upon prolonged storage in buffered and unbuffered saline, although the phenomenon is appreciably less pronounced in the latter medium. Meticulous investigations have correlated the magnitude of this temporal swelling effect to both the EWC of the DMA-NVP-TRIS polymer and the proportion of DMA within its constituent formulation. The phenomenon is greatly diminished at lower water contents and DMA levels. Hence silicone hydrogel formulations containing minimized DMA contents in relation to the primary hydrophilic NVP/MVAc components and preferentially demonstrating lower EWC values would typically be expected to exhibit greater shelf-life.

A limiting factor in reducing DMA content in a TRIS-DMA-MVAc/NVP containing silicone hydrogel polymer is clarity (haze) of the resulting polymer, since DMA can act as a reactive diluent, amalgamating the hydrophobic TRIS and the hydrophilic MVAc/NVP from the initial admixing of these monomeric components through to their final co-polymerized form. If the DMA level is too diminished within a TRIS-DMA-MVAc/NVP containing formulation, haze considerations can become significant and limit utility of the polymer for ophthalmic applications.

SiGMA contains a polymerisable methacrylate functionality, a 'MD$^R$M'-type siloxane moiety [R=(2-methylacryloxy-3-hydroxypropoxy)propyl] and a hydroxyl group that introduces both an additional dipole into this molecule and a hydrogen bond donor. Presence of the hydroxyl mediated dipole in combination with its hydrogen bonding capability in SiGMA enhances this system's compatibility with hydrophilic monomers such as MVAc, NVP, DMA, HEMA, in contrast to the TRIS 3-(tris(trimethylsiloxy)silyl)propyl methacrylate monomer, which does not possess a hydroxyl or similarly polar functional group.

SiGMA's enhanced compatibility with hydrophilic monomers, as compared to TRIS, potentially permits diminution in the amount of DMA required to yield transparent, haze-free ophthalmically viable polymers in DMA-VMAc-SiGMA or DMA-NVP-SiGMA type formulations. In such SiGMA containing formulations, increased ratios of more hydrophilic monomers such as MVAc or NVP, to less hydrophilic DMA, permits development of lower EWC polymers while maintaining acceptably wettable, lubricious surface properties in the resultant polymeric materials.

Embodiments of the present invention comprise methods of preparing silicone hydrogels including both solvated and non-solvated polymerization reactions. Variations of solvated polymerization reactions include reaction mixtures comprising a non-participating solvent. A non-participating solvent serves at least in part to solvate other reaction mixture components, such as monomers, cross-linkers, and initiators, which might not be completely miscible in bulk form in the absence of solvent. However, non-participating solvent molecules are not incorporated into the resultant polymer. A non-participating solvent may act as a hydrogen donor or acceptor.

Variations of ophthalmic lenses are produced by casting silicone hydrogels in molds, and some ophthalmic lenses are lathed from silicone hydrogel material cast in bulk shapes such as, but not limited to, buttons, bonnets, pseudo bonnets, rods, cylinders, or semi-finished lenses. Contact lenses and other ophthalmic lenses are frequently, but not necessarily, lathed at ambient room temperature. However, temperature of the silicone hydrogel material itself may be increased above room temperature during ambient room temperature lathing, and the $T_g$ of a silicone hydrogel represents a temperature ceiling for lathability of the material. Thus a silicone hydrogel may require a $T_g$ above room temperature in order to be lathable in a room temperature environment.

Lathable bulk silicone hydrogel material is typically, but not necessarily, produced from a polymerization reaction mixture that is substantially free of non-participating diluent solvent. In contrast, cast-molded lenses are typically produced from a solvated polymerization reaction mixture. A solvated polymerization reaction mixture comprises a non-participating solvent, the non-participating solvent being present in the reaction mixture, at least in part to facilitate dissolution of other reaction mixture components, but not becoming a constituent in a polymer product.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning "either or both."

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct connection between the identified elements, components, or objects. Often the manner of the coupling will be related specifically to the manner in which the two coupled elements interact.

The term "hydrogel," as used in this specification and appended claims, refers to a polymerization product of one or more hydrophilic monomers, the polymerization product being adapted to comprise at least 10% by weight water when fully hydrated.

The term "silicone hydrogel," as used in this specification and appended claims, refers to a hydrogel that is the polymerization product of one or more silicon-containing monomers, a proportion of the silicone hydrogel comprising the silicon-containing monomer being at least 0.5% by weight.

The terms "alkyl siloxy functional group" or "alkyl siloxy group," as used in this specification and appended claims, refers to a substituent comprising a silicone atom directly bonded to at least one oxygen atom and at least one alkyl group, the alkyl group having the general formula $C_nH_{2n+1}$. Examples of alkyl siloxy functional groups have the following formulas [XVI],

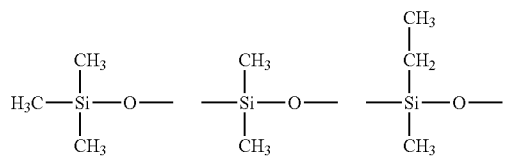

[XVI]

The terms "alkyl group" or "alkyl functional group," as used in this specification and appended claims, refer to an alkyl substituent having the general formula $C_nH_{2n+1}$. Where n is an integer from 1 to 6, inclusive, the alkyl group or alkyl functional group is a "lower alkyl group" or "lower alkyl functional group."

The term "substantially free," as used in this specification and appended claims, refers to a reaction mixture or polymer composition that comprises less than 2% by weight of the component to which the term "substantially free" refers. For instance, a reaction mixture that is substantially free of silicone-containing prepolymers comprises less than 2% by weight silicone-containing prepolymers; that is, silicone-containing prepolymers contribute less than 2% to the weight of the reaction mixture. Similarly, a reaction mixture that is substantially free of silicone-containing non-participating solvent comprises less than 2% by weight non-participating solvent; that is, non-participating solvent contributes less than 2% to the weight of the reaction mixture. As used herein, substantially free does not apply to cross-linking agents or initiators because those reaction mixture components are routinely used in relatively small quantities. Thus a reaction mixture that comprises 0.10% AIBN (a thermal initiator) and 0.75% HDDA (a cross-linker) are not substantially free of AIBN or HDDA.

The term "ophthalmic lens," as used in this specification and appended claims, refers to a lens adapted to be placed or worn in intimate contact with a user's eye. Some ophthalmic lenses, such as contact lenses reside in intimate contact with a tear film or other liquid film that usually resides between the contact lens and a user's eye. Examples of ophthalmic lenses include, but are not limited to, contact lenses in all their variants, therapeutic lenses, protective lenses, cosmetic lenses, drug delivery devices, and intraocular lenses. Ophthalmic lenses as defined herein may also include 'hybrid devices' lying in the interzone between fully implantable ophthalmic devices such as intraocular lenses and fully externalized devices such as contact lenses; these 'hybrid devices' may include but are not limited to corneal inserts, corneal rings, corneal inlays and corneal onlays.

The term "fully hydrated," as used in this specification and appended claims, refers to compositions that are substantially in equilibrium with water, a buffered solution that approximates physiological pH and ionic strength, a buffered solution that approximates a human ocular environment, or a human ocular environment. Thus, where modulus of elasticity or oxygen permeability is measured, a fully hydrated hydrogel material is equilibrated with water or the appropriate aqueous solution. Ophthalmic lenses comprising hydrogel material are typically stored in buffered aqueous saline solution, pH about 7.4, or in 0.9% NaCl aqueous solution.

The term "substantially dehydrated," as used in this specification and appended claims, refers to hydrogel compositions within which less than 1% water by weight resides. As used in this application, $T_g$, Shore D hardness, and lathability apply to hydrogel material that is substantially dehydrated, unless otherwise specified.

The term "true monomer," as used in this specification and appended claims, refers to monomers that have not been polymerized or pre-polymerized. True monomers are not part of a polymer, prepolymer, or macromonomer. For the purposes of this specification and appended claims, molecules with molecular weights greater than 1000 are considered polymers, prepolymers, or macromonomers, and are therefore not "true monomers." True monomers contain less than 10 repeating subunits. Some embodiments of true monomers contain preferably less than 8 repeating subunits, and most preferably less than 6 repeating subunits.

The term "monomer," as used in this specification and appended claims, refers to a compound adapted to polymerize (or copolymerize with other monomers), under polymerization reaction conditions. As used in this application, the term monomer includes end-capped and other derivatized monomers, prepolymers, and macromonomers. After incorporation into a polymer, a monomer is still referred to as a monomer. Persons of ordinary skill in the art recognize that a monomer that is incorporated into a polymer or prepolymer is chemically modified by incorporation, such that the incorporated monomer is not identical to the unincorporated monomer.

The terms "hydrophilic monomer," "hydrophilic substituted N-vinyl acetamide monomer," and "hydrophilic non-acetamide monomer," as used in this specification and appended claims, refer to monomers that upon homopolymerisation in the presence of a small amount of cross-linking agent, form homopolymers that are at least 20% by weight water when fully hydrated. Variations of hydrophilic monomers form homopolymers that are 38% or greater by weight water when fully hydrated. For instance, it is believed that fully hydrated poly-HEMA is approximately 38% by weight water, fully hydrated poly-NVP is approximately 90% by weight water; fully hydrated poly-MVAc is approximately 95% by weight water; and fully hydrated poly-DMA is approximately 81% by weight water. Accordingly, hydrophilic monomers form homopolymers that, when fully hydrated, are preferably at least 20% water by weight, more preferably at least 40% water by weight, and most preferably at least 50% water by weight."

The terms "reaction mixture," or "polymerization reaction mixture," as used in this specification and appended claims, refers to any combination of reaction components, including, but not limited to, monomers and other reactants, solvents, catalysts, initiators, cross-linkers, color additives, or UV absorbers that are combined, mixed, or blended under conditions that result in a polymerization reaction. The reaction mixture may comprise a solution, heterogeneous mixture, homogeneous mixture, emulsion, suspension, other composition, or mixtures thereof.

The term "approximately," as used in this specification and appended claims, refers to plus or minus 10% of the value given. For example: "approximately 25.0% NVP" means a range of NVP content from 22.5% to 27.5%; "approximately 0.010% component X" means a range of compound X from 0.009% to 0.011%; and "approximately 50 g" means a range from 45 g to 55 g.

The term "about," as used in this specification and appended claims, refers to plus or minus 20% of the value given.

The term "lathable," as used in this specification and appended claims, refers to a composition that is adapted to be cut with a lathe to produce a serviceable ophthalmic lens, or to generate a product that can be polished to produce a serviceable ophthalmic lens. Thus a lathable silicone hydrogel blank can be cut with a lathe to produce an ophthalmic lens without substantial burns or surface rips, and that has at most only minor surface imperfections that can be substantially removed by polishing. In order to be serviceable, a lathed contact lens must have substantially high quality optics. Unless otherwise specified, lathability refers to hydrogel material that is substantially dehydrated. A composition that is lathable at or above room temperature is adapted to be cut with a lathe in an environment with ambient temperature at 20° C. to 23.5° C. (room temperature) or above 23.5° C. (above room temperature). It is appreciated by a person of ordinary skill in the art that hydrogel material being cut with a lathe typically gets substantially hotter than ambient temperature, especially proximate the interface between a cutting edge and the hydrogel material. Thus temperature of a silicone hydrogel material being cut with a lathe in an environment with an ambient temperature of 23.5° C. will typically be greater than 23.5° C. at the cutting edge interface, and potentially higher than 40° C. A hydrogel material that is lathable at or above room temperature can be lathed without additional environmental protocols such as refrigeration or employment of chilled tooling or chilled chucks.

The terms "polymer" and "copolymer" are used interchangeably in this specification and appended claims, and refer to a polymer comprising one or more species of monomer. As used here, polymers and copolymers are molecules comprising repeating structural units that are linked by covalent bonds, the repeating structural units being monomers.

The term "modulus of elasticity" or "modulus," as used in this specification and appended claims, refers to Young's modulus of elasticity (also referred to as tensile modulus of elasticity), which is a standard measure of elasticity known to persons of ordinary skill in the art. The unit for expressing "modulus" or "modulus of elasticity" is the pascal (Pa), a unit known to persons of ordinary skill in the art (1 pascal=1 N/m$^2$, where N=Newton and m=meter). A practical unit used in this application is the megapascal (MPa; 1 MPa=1×10$^6$ Pa). 1 MPa is approximately equal to 102 g/mm$^2$ or 1×10$^7$ dynes/cm$^2$. As it pertains to this application, modulus is measured and expressed for fully hydrated hydrogel material, unless otherwise specified.

The term "sessile contact angle," as used in this specification and appended claims, refers to an index of surface wetting known to persons of ordinary skill in the art. As it pertains to this application, sessile contact angle is measured and expressed for fully hydrated hydrogel material, unless otherwise specified.

The term "oxygen permeability," as used in this specification and appended claims, is abbreviated Dk, and is expressed in Barrers (1 Barrer=10$^{-11}$ cm$^2$·mL O$_2$/cm$^3$·second·mmHg. As it pertains to this application, oxygen permeability is measured and expressed for fully hydrated hydrogel material, unless otherwise specified.

The term "oxygen transmissibility," as used in this specification and appended claims, is abbreviated Dk/t, where t is a thickness of a hydrogel film or ophthalmic lens. Dk/t is expressed×10$^{-9}$ cm·mLO$_2$/cm$^3$·second·mmHg. Thus a lens made of material with an oxygen permeability of 60 Barrers and a thickness of 0.008 cm has oxygen transmissibility of 60×10$^{-11}$ (cm$^2$·mL O$_2$/cm$^3$·second·mmHg)/0.008 cm=75× 10$^{-9}$ cm·mLO$_2$/cm$^3$·second·mmHg. Because Dk/t is expressed×10$^{-9}$ cm·mLO$_2$/cm3·second·mmHg, Dk/t for the aforementioned lens is 75.

The term "room temperature," as used in this specification and appended claims, refers to a temperature range of 20° C. to 23.5° C. Above room temperature is therefore above 23.5° C.

The term "interpenetrating network," "interpenetrating networks," "IPN," and "IPNs," as used in this specification and appended claims, refers to a combination of two or more polymers in network form, at least one of which is polymerized or cross-linked in the immediate presence of the other.

Throughout this specification and appended claims, percent (%) composition is by weight, except where clearly indicated otherwise in context.

Analytical Methods

Analytical methods for assessing properties of hydrogel materials and ophthalmic lenses are described below.

Mechanical Properties

Modulus of elasticity, tensile strength, and elongation to break are determined by tensile testing of material using a Zwick Z0.5 tensiometer equipped with a KAD-Z 100N load cell. The jaws of the tensiometer are set to 5-10 mm separation depending on the dimensions of the material being tested, and test speed to 10 mm/min.

Test strips are prepared by first machining flat disks with a constant thickness of typically 0.20 mm from standard contact lens blanks. The disks are hydrated in buffered saline and autoclaved. Strips with a width typically of 2.0 mm are cut from the hydrated disks and individually mounted between the jaws of the tensiometer. The strip being tested is held under tension, and applied force is gradually increased until the sample breaks. The modulus of elasticity is determined from a graphical plot of stress vs. strain over the elastic region of the curve. The tensile strength is the stress required to break the sample. The elongation to break is the strain on the sample expressed as a percentage. For each material a minimum of 5 strips are tested, and the results averaged.

Water Content

Water content by weight is determined using a procedure based upon guidance specified in the following standard. ISO 18369-4:2006 Ophthalmic Optics—Contact lenses—Part 4: Physicochemical properties of contact lens materials. Specifically, this corresponds to section 4.6.2 Gravimetric determination of water content of hydrogel lens by loss on drying using an oven. After accurate weighing of the finished contact lens, the hydrated lenses are dried to constant mass in an oven and weighed again. The equilibrium water content (EWC) is expressed as:

$$EWC = \frac{\text{Weight of water in hydrated gel}}{\text{Total weight of hydrated gel}} \times 100$$

Equilibrium water content is synonymous with fully hydrated water content for the purposes of this specification and appended claims.

Oxygen Permeability

Oxygen permeability is measured in fully hydrated hydrogel material in a water saturated air environment at 35° C. The oxygen permeability is measured using the procedure outlined in the following standard. ISO 18369-4:2006 Ophthalmic Optics—Contact lenses—Part 4: Physicochemical properties of contact lens materials. This corresponds to section 4.4 Oxygen Permeability and more specifically section 4.4.3 Polarographic method. Measurements were made using an $O_2$ Permeometer Model 201T supplied by the Rehder Development Company, California, USA.

For each material to be measured a minimum of 4 plano contact lenses with different centre thicknesses (t) ranging from 0.10 to 0.30 mm are prepared following normal lens manufacturing methods. The design of the fully hydrated lenses are such that the central region, from where oxygen flux measurements are taken, are of constant thickness. For each lens an initial oxygen transmissibility (Dk/t) measurement is determined, and then corrected for edge effects by application of a numerical method described in ISO 18369-2004. To correct for boundary effects, the reciprocal of the corrected oxygen transmissibility's of each of the lenses is plotted against t. The inverse of the gradient of the least squares best fit of the line is equal to the corrected Oxygen Permeability (Dk) of the material. Plano is a lens with zero power and as such does not provide any visual correction. Dk measurements are performed on plano lenses because the front and back surfaces are parallel to each other. Consequently the lens is of constant thickness over the area the measurement is being taken from.

As described by ISO 18369-2004 the equipment is calibrated using reference materials obtained from the Oxygen Permeability Reference Material Repository at the University of Alabama, Birmingham, USA. The corrected Dk of 4 reference materials with Oxygen Permeability in the range of 26-130 Barrers are determined by the method described above, and then used to construct a calibration curve from which a linear regression is derived.

The calibrated and corrected Dk of an unknown sample can then be derived by application of the linear regression to the corrected Dk initially measured.

Shore D Hardness

Shore D Hardness is measured using a calibrated Shore Scale Durometer Hardness Tester supplied by Bowers Metrology, UK. A trimmed blank of material is placed in line with the needle on the durometer. The blank is moved up as quickly as possible without shock towards the needle on the durometer, raising the weight until the needle on the dial will not move any further. The handle is held in this position for one second and the reading recorded. A minimum of 4 measurements are taken for each material and averaged.

Sessile Contact Angle

Sessile contact angle is determined using the sessile drop technique using the Krüss EasyDrop Drop Shape Analysis System. A hydrogel lens to be measured is placed on a dome support and the front surface lightly blotted dry with a lint free tissue. A 2.0 µL drop of distilled water is placed on the surface of the material being measured, and a digital image of the drop is captured. The sessile contact angle is then measured from the image and is the angle that the drop of water makes with the surface. The angle at both sides of the drop is measured and averaged.

On-Eye Water Loss

Water loss during wear is determined using an Atago handheld refractometer, model CL-1. The refractometer is calibrated at 20° C. using saturated salt solution. The plate of the refractometer is opened and a drop of solution placed on the prism. The plate is then closed so that the standard solution covers the whole prism. The eyepiece is focused to produce a crisp image, and the position of the interface between the white and blue portions in the field of view adjusted to the S20 position.

Water content of an ophthalmic lens is measured by opening the plate and placing the lens convex side down on the prism. The plate is carefully closed, flattening the lens onto the prism. Light pressure is applied and water content of the lens is read from the scale viewed through the eyepiece.

Water loss during wear is determined by first taking a base water content measurement from a fully hydrated lens, fresh from its vial at room temperature (20° C. to 23.5° C.). The lens is then worn for a minimum of 8 hours. Immediately following removal of the lens from the eye, water content is measured again, and the difference between the two measurements provides an estimate of water loss from the lens during wear.

The on-eye water loss measuring method reported here utilizes baseline water content measurement at room temperature, and final, after-wear water content measurement at higher temperature, the after-wear measurement being made on a lens that is heated to about 35° C. during wear. Because water content of a hydrogel lens at 35° C. is less than room temperature, this on-eye water loss measuring method overestimates on-eye water loss.

On-eye water loss data reported here was collected over a period of 1 month in a variety of environments, and the values measured were averaged. Ambient temperatures were 15-22° C. and relative humidity was approximately 60%.

Glass Transition Temperature ($T_g$)

Differential Scanning calorimetry (DSC) analysis technique familiar to persons of ordinary skill in the art is performed using a DSC2920 (TA Instruments) to measure the thermal properties of the samples. The samples are sealed in aluminum pans, heated to 130° C., and maintained at that temperature for 30 mins to ensure complete dehydration. The temperature is then ramped from 130° C. to 25° C. in order to determine the $T_g$. $T_g$ is the onset of the glass transition determined during an initial sample heating cycle. $T_g$ is determined from the extrapolated onset of glass transition for the first heating cycle, not the mid-point of glass transition during the first heating cycle.

A First Method of Making a Silicone Hydrogel

A first method of making a silicone hydrogel embodiment comprises making a reaction mixture by combining the following compositions:
- a silicon-containing monomer in an amount preferably 2.5 g to 30 g, more preferably 5.0 g to 20 g, and most preferably 7.5 g to 15 g; and
- a first hydrophilic monomer in an amount preferably between 0 g and 90 g, more preferably 20 g to 80 g, and most preferably 40 g to 65 g; and
- a second hydrophilic monomer in an amount preferably 0 g to 60 g, more preferably 7.5 g to 45 g, and most preferably 15 g to 30 g; and
- a third hydrophilic monomer in an amount preferably 0 g to 37 g, more preferably 0 g to 27 g, and most preferably 0 g to 22 g; and
- a fluorine-containing monomer in an amount preferably 0 g to 10 g, more preferably 2.0 g to 8.0 g, and most preferably 4.0 g to 6.0 g; and
- a cross-linker in an amount preferably between 0 g and 3.75 g, more preferably 0.20 g to 2.0 g, and most preferably 0.30 g to 1.0 g; and
- an initiator in an amount preferably between 0 g and 1.0 g, more preferably between 0 g and 0.50 g, and most preferably between 0 g and 0.20 g.

The first method reaction mixture is substantially free of non-participating solvent.

Other methods of making silicone hydrogels contemplated as within the scope of the present invention consist of, or consist essentially of, making a reaction mixture by combining the compositions named above. Some methods of making silicone hydrogels use reaction mixtures that comprise a UV initiator or other free-radical initiator in addition to or in place of a thermal initiator, and some methods use reaction mixtures comprising non-participating solvents.

The reaction mixture of the first method is mixed and dispensed into molds, which are maintained at between 37° C. and 75° C. for at least 2 hours, whereupon the resulting silicone hydrogel is removed from the molds and annealed by heating in a fan oven under atmospheric pressure for at least 90 minutes at an oven temperature of 127° C. Some embodiments of silicone hydrogels are annealed at other temperatures, including a range of temperatures that are typically, but not necessarily, above 100° C. Variations are annealed at reduced pressure.

Some ophthalmic lenses, including but not limited to contact lenses, are made by casting the silicone hydrogels directly in lens molds. Variations of ophthalmic lenses are made by casting silicone hydrogels into bulk shapes or blanks, from which contact lenses are formed through cutting such as lathe cutting. Typically, but not necessarily, bulk or blank hydrogel material from which lenses are cut or lathed is prepared from reaction mixtures that are substantially free of non-participating solvent. Other methods of making silicone hydrogel embodiments use reaction mixtures comprising appreciable levels of non-participating solvents.

Example 1

Example 1 exemplifies the first method of making a silicone hydrogel, and comprises making a reaction mixture by combining the following reactants: approximately 10.0 g 3-(tris(trimethylsiloxy)silyl)propyl methacrylate (TRIS); approximately 59.25 g N,N-dimethyl acrylamide (DMA); approximately 25.0 g N-vinyl-2-pyrrolidone (NVP); approximately 5.0 g 1,1,1,3,3,3-hexafluoroisopropyl methacrylate (HFPM); approximately 0.75 g 1,6-hexanediol diacrylate (HDDA); and approximately 0.10 g 2,2'-azobisisobutyronitrile (AIBN). Other examples of the first method of making a silicone hydrogel consist of, or consist essentially of, making a reaction mixture by combining the Example 1 reactants listed above.

The Example 1 reaction mixture is thoroughly mixed and subsequently dispensed into cylindrical molds, which are sealed and placed in a water bath at approximately 60° C. for approximately 24 hours. The resulting silicone hydrogel is removed from the molds and annealed by heating in a fan oven under atmospheric pressure for at least 90 minutes at an oven temperature of 127° C.

A First Embodiment Silicone Hydrogel

A first embodiment silicone hydrogel comprises a copolymer including the following:
- a silicon-containing monomer in a proportion preferably 2.5% to 30%, more preferably 5.0% to 20%, and most preferably 7.5% to 15%; and
- a first hydrophilic monomer in a proportion preferably between 0% and 90%, more preferably 20% to 80%, and most preferably 40% to 65%; and
- a second hydrophilic monomer in a proportion preferably 0% to 60%, more preferably 7.5% to 45%, and most preferably 15% to 30%; and
- a third hydrophilic monomer in a proportion preferably 0% to 37%, more preferably 0% to 27%, and most preferably 0% to 22%; and
- a fluorine-containing monomer in a proportion preferably between 0% and 10%, more preferably 2.0% to 8.0%, and most preferably 4.0% to 6.0%; and
- a cross-linker in a proportion preferably between 0% and 3.75%, more preferably 0.20% to 2.0%, and most preferably 0.30% to 1.0%.
- an initiator in a proportion preferably between 0% and 1.0%, more preferably between 0% and 0.50%, and most preferably between 0% and 0.20%.

Other embodiments of silicone hydrogels contemplated as within the scope of the present invention include silicone hydrogels consisting of, or consisting essentially of, first embodiment components listed above.

The first embodiment silicone hydrogel is prepared using the first method of making a silicone hydrogel. Other embodiments of the present invention are prepared using other methods of making silicone hydrogels.

In substantially dehydrated condition, variations of first embodiment silicone hydrogels are lathable at ambient temperatures at or above room temperature. During lathing, the silicone hydrogel material itself is preferably at or above room temperature, more preferably at temperatures above 25° C., even more preferably at temperatures above 27° C., and most preferably at temperatures between 27° and 58° C. Variations of silicone hydrogels have a $T_g$ preferably at or above room temperature, more preferably above 25° C., even more preferably above 27° C., even more preferably still above 40° C., and most preferably above 70° C. Some variations of hydrogels have Shore D hardness that is preferably greater than 70 at 21° C., more preferably greater than 75 at 21° C., and most preferably greater than 80 at 21° C.

Fully hydrated, first embodiment silicone hydrogels can have oxygen permeability preferably greater than 45 Barrers, and most preferably greater than 55 Barrers. Some variations of first embodiment silicone hydrogels have a sessile contact angle of less than 90°, and a modulus preferably less than 1.0 MPa, more preferably less than 0.70 MPa, and most preferably less than 0.45 MPa. Variations of the first embodiment silicone hydrogels have a tensile strength preferably greater than 0.14 MPa and most preferably greater than 0.20 MPa.

Example 2

Example 2 is a silicone hydrogel that exemplifies the first embodiment silicone hydrogel, and comprises the following proportions of components: Approximately 10.0% TRIS; approximately 59.25% DMA; approximately 25.0% NVP; approximately 5.0% HFPM; and approximately 0.75% HDDA. Some examples of silicone hydrogels contemplated within the scope of the present invention consist of, or consist essentially of, the Example 2 components listed above.

Example 2 is prepared using the Example 1 method of making a silicone hydrogel. Other embodiments of the present invention are prepared using other methods.

Example 2 silicone hydrogel in a substantially dehydrated condition is lathable at or above room temperature, having a Shore D hardness of approximately 84 at 21° C. and a $T_g$ of 108 to 116° C.

Example 2 silicone hydrogel in a fully hydrated condition has a fully hydrated water content of approximately 74%, an oxygen permeability of approximately 60 Barrers, a sessile contact angle of approximately 85°, a modulus of approximately 0.39 MPa, and a tensile strength of approximately 0.23 MPa.

Example 3

Example 3 is a silicone hydrogel that exemplifies the first embodiment silicone hydrogel copolymer and comprises the following proportions of components: approximately 10.0% TRIS; approximately 45.75% DMA; approximately 20.0% NVP; approximately 18.5% 2-hydroxyethyl methacrylate (HEMA); approximately 5.0% HFPM; and approximately 0.75% HDDA. Some examples of silicone hydrogels contemplated within the scope of the present invention consist of, or consist essentially of, the Example 3 components listed above.

Example 3 silicone hydrogel in a fully hydrated condition has a water content of approximately 66%, an oxygen permeability of approximately 53 Barrers, and a sessile contact angle of approximately 85°.

Table 1 displays compositions and physical properties of numerous examples of the second embodiment silicone hydrogel. Examples 2 and 3 are the only hydrogels in Table 1 that achieve Dk>45, water content>60%, and contact angle<90°. Moreover, Example 2 exhibits a relatively low modulus of 0.39 MPa. Example 3 presumably also has a modulus less than 0.7 MPa, but the modulus of Example 3 was not measured. First embodiment silicone hydrogel examples displayed in Table 1 show a positive correlation between water content and oxygen permeability, which facilitates achieving the sometimes contradictory goals of relatively high oxygen permeability in a relatively wettable ophthalmic lens.

TABLE 1

| Component (%) | Ex. 2 | Ex. 3 | Ex. 6 | Ex. 7 | Ex. 8 | Ex. 9 | Ex. 10 |
|---|---|---|---|---|---|---|---|
| TRIS | 10.0 | 10.0 | 10.0 | 10.0 | 10.0 | 20.0 | 30.0 |
| DMA | 59.25 | 45.75 | 24.25 | 36.25 | 84.25 | 59.25 | 59.25 |
| HEMA | — | 18.5 | 40.0 | 28.0 | — | — | — |
| NVP | 25.0 | 20.0 | 20.0 | 20.0 | — | 15.0 | 5.0 |
| HFPM | 5.0 | 5.0 | 5.0 | 5.0 | 5.0 | 5.0 | 5.0 |
| HDDA | 0.75 | 0.75 | 0.75 | 0.75 | 0.75 | 0.75 | 0.75 |
| Property | | | | | | | |
| Dk (Barrers) | 59 | 53 | 44 | 51 | NA | 57 | 66 |
| Water Content* | 74 | 66 | 54 | 62 | NA | 67 | 59 |
| C.A.** | 85 | 85 | 105 | 95 | NA | 93 | 111 |
| Modulus (MPa) | 0.39 | ND | ND | ND | NA | 0.44 | 0.44 |

NA = not applicable; reaction terminated because separate phases formed in reaction mixture
ND = not determined
*% water by weight
**sessile contact angle, in degrees A Second Method of Making an Ophthalmic Lens A second method of making an ophthalmic lens comprises machining blanks from first embodiment silicone hydrogel material. Lens shapes are cut from blanks with a lathe, and are subsequently hydrated and sterilized. Second method lathe cutting is performed at ambient temperatures at or above room temperature. Lenses made by the second method include, but are not limited to, contact lenses.

Other methods of making an ophthalmic lens comprise molding the lenses directly, rather than forming bulk material from which lenses are cut. Typically, but not necessarily, molded lenses are made using silicone hydrogel reaction mixtures comprising non-participating solvents.

Example 4

Example 4 is a method of making an ophthalmic lens that exemplifies the second method of making an ophthalmic lens. In Example 4, cylinders of Example 2 silicone hydrogel are machined into blanks that are 12.7 mm diameter by 5.0 mm thick. Example 4 dry lens shapes are formed from the Example 2 cylinders using conventional lathe cutting techniques known to persons of ordinary skill in the art. Example 4 dry lenses are eluted and hydrated in borate buffered saline for 18 hours, transferred to fresh borate buffered saline, and then thermally sterilized. Lenses made by the Example 4 method include, but are not limited to, contact lenses.

A Second Embodiment Ophthalmic lens

A second embodiment ophthalmic lens comprises silicone hydrogel, and is prepared by the second method of making an ophthalmic lens. The lens has oxygen transmissibility (DK/t) preferably greater than 55, more preferably greater than 70, and most preferably greater than 74. Variations of the lens are adapted to have on-eye water loss preferably less than 3% and most preferably less than 2%.

Example 5

Example 5 is an ophthalmic lens that exemplifies the second embodiment ophthalmic lens, and is prepared by the Example 4 method of making a contact lens. The Example 5 contact lens, with an average center thickness of 0.08 mm, has an oxygen transmissibility (Dk/t) of approximately 75, and is adapted to have on-eye water loss of 2% or less. The Example 5 ophthalmic lens is a contact lens.

A Third Method of Making a Silicone Hydrogel

A third method of making a silicone hydrogel comprises making a reaction mixture by combining the following components a silicon-containing monomer in an amount preferably greater than 25 g, more preferably between 25 g and 40 g, still more preferably about 32.75 g, and most preferably approximately 32.75 g; and a hydrophilic substituted N-vinyl acetamide monomer in an amount preferably greater than 30 g, more preferably between 34 g and 55 g; still more preferably about 44.8 g, and most preferably approximately 44.8 g; and a hydrophilic non-acetamide monomer in an amount resulting in a hydrophilic substituted N-vinyl acetamide monomer to hydrophilic non-acetamide monomer weight ratio preferably greater than 2.1:1 and most preferably in a range between 3:1 and 7:1; and a total hydrophilic monomer content preferably greater than 44 g, more preferably between 49.7 g and 69.7 g, and most preferably approximately 56 g; and a fluorine-containing monomer in an amount preferably 0 g to 10 g, more preferably 2.0 g to 8.0 g, and most preferably 4.0 g to 6.0 g; and a first cross-linker in an amount preferably between 0 g and 3.75 g, more preferably 0.10 g to 2.0 g, and most preferably 0.20 g to 1.0 g; and a second cross-linker in an amount preferably between 0 g and 3.75 g, more preferably 0.20 g to 2.0 g, and most preferably 0.30 g to 1.0 g; and an initiator in an amount preferably between 0 g and 1.0 g, more preferably between 0 and 0.50 g, and most preferably between 0 g and 0.20 g; and a strengthening monomer in an amount preferably 0 g to 20 g, more preferably 0 g to 15 g, and most preferably about 10 g.

The third method reaction mixture is substantially free of non-participating solvent.

The reaction mixture of the third method is mixed and dispensed into molds, which are incubated at elevated temperature. Incubation is typically, but not necessarily, between 37° C. and 75° C. for at least 2 hours, whereupon the resulting silicone hydrogel is removed from the molds. The resulting silicone hydrogel is removed from the molds and annealed by heating in a fan oven under atmospheric pressure for at least 90 minutes at an oven temperature of 127° C. Some embodiments of silicone hydrogels are annealed at other temperatures, including a range of temperatures that are typically, but not necessarily, above 100° C. Variations are annealed at reduced pressure.

Variations of silicone hydrogels made by the third method have a $T_g$ preferably at or above room temperature, more preferably above 25° C., even more preferably above 27° C., even more preferably still above 40° C., and most preferably above 45° C. Some variations of silicone hydrogels made by the third method have Shore D hardness preferably greater than 70 at 21° C., more preferably greater than 75 at 21° C., and most preferably greater than 80 at 21° C.

Example 22

Example 22 exemplifies the third method of making a silicone hydrogel, and comprises making a reaction mixture by combining the following reactants: 29.8 g TRIS; 9.9 g MMA; 14.2 g DMA; 45.4 g MVAc; 0.25 g AMA; 0.45 g TGDMA; and 0.16 g AIBN. Other examples of the third method of making a silicone hydrogel consist of, or consist essentially of, making a reaction mixture by combining the Example 22 reactants listed above.

The Example 22 reaction mixture is thoroughly mixed and subsequently dispensed into cylindrical molds, which are sealed and placed in a water bath at approximately 60° C. for approximately 24 hours. The resulting silicone hydrogel is removed from the molds and annealed by heating in a fan oven under atmospheric pressure for at least 90 minutes at an oven temperature of 127° C. Example 22 method of making a silicone hydrogel produces an Example 23 silicone hydrogel (see Table 2).

A Third Embodiment Silicone Hydrogel

A third embodiment silicone hydrogel comprises a copolymer including the following:

a silicon-containing monomer in an amount preferably greater than 25%, more preferably between 25% and 40%, still more preferably about 32.75%, and most preferably approximately 32.75%; and a hydrophilic substituted N-vinyl acetamide monomer in an amount preferably greater than 30%, more preferably between 34% and 55%; still more preferably about 44.8%, and most preferably approximately 44.8%; and a hydrophilic non-acetamide monomer in an amount resulting in a hydrophilic substituted N-vinyl acetamide monomer to hydrophilic non-acetamide monomer weight ratio preferably greater than 2.1:1 and most preferably in a range between 3:1 and 7:1; and a total hydrophilic monomer content preferably greater than 44%, more preferably between 49.7% and 69.7%, and most preferably approximately 56%; and a fluorine-containing monomer in an amount preferably 0% to 10%, more preferably 2.0% to 8.0%, and most preferably 4.0% to 6.0%; and a first cross-linker in an amount preferably 0% to 3.75%, more preferably 0.20% to 2.0%, and most preferably 0.30% to 1.0%; and a second cross-linker in an amount preferably 0% to 3.75%, more preferably 0.20% to 2.0%, and most preferably 0.30% to 1.0%; and an initiator in an amount preferably 0% to 1.0%, more preferably 0% to 0.50%, and most preferably 0% to 0.20%; and a strengthening monomer in an amount preferably 0% to 20%, more preferably 0% to 15%, and most preferably about 10%.

Other embodiments of silicone hydrogels contemplated as within the scope of the present invention include silicone hydrogels consisting of, or consisting essentially of, third embodiment components listed above.

The third embodiment silicone hydrogel is prepared using the third method of making a silicone hydrogel. Other embodiments of are prepared using other methods of making silicone hydrogels.

In substantially dehydrated condition, variations of third embodiment silicone hydrogels are lathable at ambient temperatures at or above room temperature. During lathing, the silicone hydrogel material itself is preferably at or above room temperature, more preferably at temperatures above 25° C., even more preferably at temperatures above 27° C., and most preferably at temperatures between 27° and 58° C. Some variations of third embodiment silicone hydrogels have a $T_g$ preferably at or above room temperature, more preferably above 25° C., even more preferably above 27° C., even more preferably still above 40° C., and most preferably above 45° C. Variations of third embodiment silicone hydrogels have Shore D hardness that is preferably greater than 70 at 21° C., more preferably greater than 75 at 21° C., and most preferably greater than 80 at 21° C.

Fully hydrated, third embodiment silicone hydrogels have oxygen permeability preferably greater than 45 Barrers and most preferably greater than 55 Barrers. Variations of third embodiment silicone hydrogels have a sessile contact angle preferably less than 115° and most preferably less than 110°, and fully hydrated water content preferably greater than 60% and most preferably greater than 65%. Third embodiment silicone hydrogels have a modulus preferably less than 1.0 MPa, more preferably less than 0.79 MPa, still more preferably less than 0.70 MPa, and most preferably less than 0.60 MPa.

Example 24

Example 24 is a silicone hydrogel that exemplifies the third embodiment silicone hydrogel, and comprises the following proportions of components: 35.0% SiGMA; 8.45% MMA; 7.6% DMA; 48.1% MVAc; 0.25% AMA; 0.60% TGDMA; and 0.10% AIBN. Some examples of silicone hydrogels contemplated within the scope of the present invention consist of, or consist essentially of, the Example 24 components listed above. The silicone hydrogel of Example 24 is typically prepared using the Example 22 method of making a silicone hydrogel.

Example 24 includes a hydrophilic substituted N-vinyl acetamide monomer (MVAc) in an amount of 48.1% and a hydrophilic non-acetamide monomer (DMA) in an amount of 7.6%. Accordingly, Example 24 embodies a total hydrophilic monomer content of 55.7% and a hydrophilic substituted N-vinyl acetamide monomer to hydrophilic non-acetamide monomer weight to weight ratio of 6.3.

When stored in water, aqueous buffer, or aqueous saline solution, ophthalmic lenses made from the silicone hydrogel of Example 24 typically exhibit longer shelf lives compared to previous high water content silicone hydrogel lenses comprising both NVP and DMA as predominant hydrophilic monomers. The previous lenses tend to swell when stored fully hydrated over relatively long time intervals.

The Example 24 silicone hydrogel in a substantially dehydrated condition is lathable at an ambient temperature at or above room temperature, having a Shore D hardness of 83.0 at 21° C. Fully hydrated, the Example 24 silicone hydrogel has a water content of 65.6%, an oxygen permeability of 57.4 Barrers, a sessile contact angle of 105°, and a modulus of 0.54 MPa.

Example 25

Example 25 is a silicone hydrogel that exemplifies the third embodiment silicone hydrogel copolymer and comprises the following proportions of components: 29.8% TRIS; 7.45% MMA; 4.5% EMMA; 13.7% DMA; 43.9% MVAc; 0.25% AMA; 0.45% TGDMA; and 0.16% AIBN.

The Example 25 silicone hydrogel in a substantially dehydrated condition is lathable at an ambient temperature at or above room temperature, having a Shore D hardness of 84.5 at 21° C. The silicone hydrogel of Example 25 has a fully hydrated water content of 66.7%, an oxygen permeability of 55.2 Barrers, a sessile contact angle of 107°, and a modulus of 0.51 MPa.

Table 2 displays compositions and physical properties of numerous examples of third embodiment silicone hydrogels, including Example 25. Each of the examples presented in Table 2 has an oxygen permeability greater than 55 barrers, a fully hydrated water content greater than 60%, and a modulus of elasticity less than 0.58 MPa. Examples 20, 21, and 23-25 each have a sessile contact angle less than 110°, and moreover exhibit relative resistance to swelling when stored in aqueous media, resulting in increased shelf life compared to prior art high water content lenses.

TABLE 2

| Component (%) | Ex. 18 | Ex. 19 | Ex. 20 | Ex. 21 | Ex. 23 | Ex. 24 | Ex. 25 |
|---|---|---|---|---|---|---|---|
| TRIS | 29.8 | 34.8 | 29.8 | 31.8 | 29.8 | — | 29.8 |
| SiGMA | — | — | — | — | — | 35.0 | — |
| MMA | 9.9 | — | 7.4 | 7.45 | 9.9 | 8.45 | 7.45 |
| EEMA | — | 14.9 | 4.5 | 2.5 | — | — | 4.5 |
| DMA | 14.2 | 14.9 | 13.7 | 13.7 | 14.2 | 7.6 | 13.7 |
| MVAc | 45.4 | 34.8 | 43.9 | 43.9 | 45.4 | 48.1 | 43.9 |
| AMA | 0.20 | 0.20 | 0.20 | 0.25 | 0.25 | 0.25 | 0.25 |
| TGDMA | 0.40 | 0.40 | 0.40 | 0.45 | 0.45 | 0.60 | 0.45 |
| AIBN | 0.16 | 0.16 | 0.16 | 0.16 | 0.16 | 0.10 | 0.16 |
| Property | | | | | | | |
| Dk (Barrers) | 56.5 | 63.0 | 58.6 | 59.1 | 59.0 | 57.4 | 55.2 |
| Water Content* | 67.6 | 62.0 | 65.7 | 65.8 | 67.3 | 65.6 | 66.7 |
| C.A.** | ND | 114 | 107 | 107 | 106 | 105 | 107 |
| Modulus (MPa) | 0.55 | 0.45 | 0.48 | 0.49 | 0.57 | 0.54 | 0.51 |
| Shore D hardness | ND | ND | ND | ND | 84.3 | 83.0 | 84.5 |
| $T_g$ | ND | ND | ND | ND | 50.3 | 45.3 | 49.9 |
| Elongation to Break | 303 | 223 | 261 | 260 | 278 | 206 | 268 |
| MVAc/DMA*** | 3.2 | 2.3 | 3.2 | 3.2 | 3.2 | 6.3 | 3.2 |

*% water by weight
**sessile contact angle, in degrees
***weight to weight ratio of MVAc, a hydrophilic substituted N-vinyl acetamide monomer, to DMA, a hydrophilic non-acetamide monomer
ND = not determined A Fourth Method of Making an Ophthalmic Lens A fourth method of making an ophthalmic lens comprises machining blanks from third embodiment silicone hydrogel material. Lens shapes are cut from blanks with a lathe, and are subsequently hydrated and sterilized. Fourth method lathe cutting is performed at ambient temperatures at or above room temperature. Lenses made by the fourth method of making an ophthalmic lens include, but are not limited to, contact lenses.

Example 26

Example 26 is a method of making an ophthalmic lens that exemplifies the fourth method of making an ophthalmic lens. In Example 26, cylinders of Example 24 silicone hydrogel are machined into blanks that are 12.7 mm diameter by 5.0 mm thick. Example 26 dry lens shapes are formed from the Example 24 cylinders using conventional lathe cutting techniques known to persons of ordinary skill in the art. The lenses are eluted and hydrated in borate buffered saline for 18 hours, transferred to fresh borate buffered saline, and then thermally sterilized. Lenses made by the Example 26 method include, but are not limited to, contact lenses.

A Fourth Embodiment Ophthalmic lens

A fourth embodiment ophthalmic lens comprises silicone hydrogel, and is prepared by the fourth method of making an ophthalmic lens. The lens has oxygen transmissibility (DK/t) preferably greater than 55, more preferably greater than 69, and most preferably greater than 72. Variations of the lens are adapted to have on-eye water loss preferably less than 3% and most preferably less than 2%.

Example 27

Example 27 exemplifies the fourth embodiment ophthalmic lens, and is prepared by the Example 26 method of making an ophthalmic lens. The Example 27 ophthalmic lens is a contact lens with an average center thickness of 0.08 mm and an oxygen transmissibility (Dk/t) of approximately 74. It is adapted to have on-eye water loss of 4% or less.

Table 3 displays compositions and physical properties of numerous examples of the third embodiment silicone hydrogel. Each of the examples presented in Table 3 has an oxygen permeability greater than 52 barrers, a fully hydrated water content of 62% or greater, and a modulus of elasticity less than 0.79 MPa.

TABLE 3

| Component (%) | Ex. 27 | Ex. 28 | Ex. 29 | Ex. 30 | Ex. 31 | Ex. 32 | Ex. 33 |
|---|---|---|---|---|---|---|---|
| TRIS | 29.9 | 29.8 | 22.5 | 15.0 | 7.5 | 29.8 | 29.8 |
| SiGMA | — | — | 7.5 | 15.0 | 22.5 | — | — |
| MMA | 10.0 | 9.9 | 10.0 | 10.0 | 10.0 | 5.0 | — |
| HFPM | — | — | — | — | — | 5.0 | 9.9 |
| DMA | 14.9 | 9.9 | 14.3 | 14.3 | 14.3 | 14.2 | 14.2 |
| MVAc | 44.8 | 49.7 | 45.7 | 45.7 | 45.7 | 45.4 | 45.4 |
| AMA | 0.20 | 0.20 | 0.20 | 0.20 | 0.20 | 0.25 | 0.25 |
| TGDMA | 0.30 | 0.40 | 0.45 | 0.45 | 0.45 | 0.45 | 0.45 |
| AIBN | 0.16 | 0.16 | 0.10 | 0.10 | 0.10 | 0.16 | 0.16 |
| Property | | | | | | | |
| Dk (Barrers) | 53 | 60 | 57.0 | 54.0 | 55.6 | 56.2 | 58.9 |
| Water Content* | 68.0 | 69.5 | 67.3 | 68.1 | 69.0 | 66.8 | 65.7 |
| C.A.** | 101 | 104 | 107 | 107 | 106 | 108 | 108 |
| Modulus (MPa) | 0.48 | 0.58 | 0.43 | 0.36 | 0.35 | 0.50 | 0.77 |
| $T_g$ | ND | ND | ND | ND | ND | 49.3 | 51.0 |
| Elongation to break | 316 | 236 | 283 | 274 | 264 | 223 | 224 |
| MVAc/DMA*** | 3.0 | 5.0 | 3.2 | 3.2 | 3.2 | 3.2 | 3.2 |

*% water by weight
**sessile contact angle, in degrees
***weight to weight ratio of MVAc, a hydrophilic substituted N-vinyl acetamide monomer, to DMA, a hydrophilic non-acetamide monomer
ND = not determined

ALTERNATIVE EMBODIMENTS AND VARIATIONS

The various embodiments, examples, and variations thereof, described above, are merely exemplary, and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A silicone hydrogel material having oxygen permeability greater than 45 Barrers, a water content greater than 60% by weight, and a modulus less than 1.0 MPa, and including a copolymer comprising:
   a silicon-containing monomer in an amount of 7.5% by weight or greater;
   a hydrophilic substituted N-vinyl acetamide monomer in an amount greater than 30% by weight;
   a hydrophilic non-acetamide monomer in an amount resulting in a hydrophilic substituted N-vinyl acetamide monomer to hydrophilic non-acetamide monomer weight to weight ratio of greater than 2.1 to 1.

2. The silicone hydrogel of claim 1, further comprising a fluorine-containing monomer.

3. The silicone hydrogel of claim 2, wherein the fluorine-containing monomer is selected from the group consisting of 1,1,1,3,3,3-hexafluoroisopropyl methacrylate (HFPM); 2,2,2-trifluoroethyl methacrylate; 2,2,3,3,3-pentafluoropropyl methacrylate; 2,2,3,3,3-pentafluoropentyl acrylate; and 1,1,1,3,3,3-hexafluoroisopropyl acrylate.

4. The silicone hydrogel of claim 2, wherein the fluorine-containing monomer is present in an amount between 0% and 10% by weight.

5. A silicone hydrogel material having oxygen permeability greater than 45 Barrers, a water content greater than 60% by weight, and a modulus less than 1.0 MPa, and including a copolymer comprising:
   a silicon-containing monomer in an amount of 7.5% by weight or greater;
   a hydrophilic substituted N-vinyl acetamide monomer;
   a hydrophilic non-acetamide monomer in an amount resulting in a hydrophilic substituted N-vinyl acetamide monomer to hydrophilic non-acetamide monomer weight to weight ratio of greater than 2.1 to 1.

6. The silicone hydrogel of claim 5, further comprising a fluorine-containing monomer.

7. The silicone hydrogel of claim 6, wherein the fluorine-containing monomer is present in an amount between 0% and 10% by weight.

8. The silicone hydrogel of claim 5, wherein the fluorine-containing monomer is selected from the group consisting of 1,1,1,3,3,3-hexafluoroisopropyl methacrylate (HFPM); 2,2,2-trifluoroethyl methacrylate; 2,2,3,3,3-pentafluoropropyl methacrylate; 2,2,3,3,3-pentafluoropentyl acrylate; and 1,1,3,3,3-hexafluoroisopropyl acrylate.

9. A silicone hydrogel material having oxygen permeability greater than 45 Barrers, a water content greater than 60% by weight, and a modulus less than 1.0 MPa, and including a copolymer comprising:
   multiple silicon-containing monomers, wherein total weight % for the multiple silicon-containing monomers is greater than 25%;
   a hydrophilic substituted N-vinyl acetamide monomer in an amount greater than 30% by weight;
   a hydrophilic non-acetamide monomer in an amount resulting in a hydrophilic substituted N-vinyl acetamide monomer to hydrophilic non-acetamide monomer weight to weight ratio of greater than 2.1 to 1.

10. The silicone hydrogel of claim 9, further comprising a fluorine-containing monomer.

11. The silicone hydrogel of claim 10, wherein the fluorine-containing monomer is selected from the group consisting of 1,1,1,3,3,3-hexafluoroisopropyl methacrylate (HFPM); 2,2,2-trifluoroethyl methacrylate; 2,2,3,3,3-pentafluoropropyl methacrylate; 2,2,3,3,3-pentafluoropentyl acrylate; and 1,1,1,3,3,3-hexafluoroisopropyl acrylate.

12. The silicone hydrogel of claim 10, wherein the fluorine-containing monomer is present in an amount between 0% and 10% by weight.

* * * * *